US006580424B1

(12) United States Patent
Krumm

(10) Patent No.: US 6,580,424 B1
(45) Date of Patent: Jun. 17, 2003

(54) SYSTEM AND METHOD FOR INTERACTIVE ROOM MODELING FROM CAMERA IMAGES

(75) Inventor: John Krumm, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 09/692,959

(22) Filed: Oct. 21, 2000

(51) Int. Cl.[7] .............................................. G06T 15/00
(52) U.S. Cl. ...................................... 345/419; 345/420
(58) Field of Search ................................ 345/418, 419, 345/420, 421, 422, 423, 426, 427

(56) References Cited

U.S. PATENT DOCUMENTS 5,684,935 A  * 11/1997 Demesa, III et al.
6,137,491 A  * 10/2000 Szeliski
6,466,207 B1 * 10/2002 Gortler et al.
6,480,190 B1 * 11/2002 Pfister et al.

* cited by examiner

*Primary Examiner*—Cliff N. Vo
(74) *Attorney, Agent, or Firm*—Lyon & Harr, LLP; Katrina A. Lyon

(57) ABSTRACT

A system and method for interactively modeling a room using camera images. Images of the room are input. The floor is marked with calibration markers placed at known (x,y) locations. The user runs a program that lets him "click" on these points to establish a correspondence between their absolute (x,y) coordinates on the floor and their image coordinates in each view. These correspondences are used to compute a "homography" for each image which in turn is used to compute a warped version of each image, showing what the room would look like if viewed from above. These warped images are each rendered with respect to the same origin and are used as guides in a drawing program to drag drawings of objects to place them on top of the corresponding objects in the warped images. The warped images are then deleted, leaving behind the room's objects in their correct locations.

28 Claims, 9 Drawing Sheets

SYSTEM AND METHOD FOR INTERACTIVE ROOM MODELING FROM CAMERA IMAGES

BACKGROUND OF THE INVENTION

1. Technical Field

This invention is directed towards a system and method for creating a geometric floor model of a room interactively, based on images of the room.

2. Background Art

Video cameras are sometimes used to monitor people in a room for security, safety, or assistance. These goals can be facilitated by a knowledge of the locations of the room's walls, doors, furniture, and devices. For instance, the positions of computer screens in a room can be used to decide where to display a message for a person in the room. One way to build a geometric model of the room is to manually measure the locations of the room's contents with, say, a tape measure. This is tedious, and the manual work must be repeated each time one of the objects in the room is moved.

SUMMARY

The present invention overcomes the aforementioned limitations in prior room modeling systems by a system and method that allows the user to interactively generate a geometrically accurate floor map of the room without having to measure the locations of various objects in the room first. Based on images of the room, the system and method according to the present invention lets a user interactively build a floor plan of the room by dragging pictorial representations of the objects in the room on a computer monitor screen.

By way of overview, this system and method according to the present invention begins with one or more images of a room. These images preferably include views of calibration markers that were placed at known (x,y) locations on the floor of the room. It is necessary to have at least one view or image of everything the user desires to have modeled in the floor plan. However, more than one view of each item is not necessary. The calibration markers may be marked with an index number and possibly their (x,y) locations in a world coordinate system in each image. The user preferably runs a program that lets him or her select the centers of the calibration markers in each image displayed on a computer monitor screen to establish a correspondence between the absolute (x,y) coordinates on the floor and their image coordinates in each view. These correspondences are used to compute a "homography" for each image. The homography is in turn used to compute a warped or ground plane version of each image, showing what the room would look like if viewed from above. These warped or ground plane images are each preferably rendered with respect to the same origin. With the images warped to a common viewpoint and scale, they can be used as guides in a conventional drawing program such as MICROSOFT VISIO®. For example, the user can drag icons of furniture, walls, etc. on top of the warped images. The warped images are then deleted, leaving behind the room's objects in their correct locations to create an accurate floor plan of the room. The next paragraphs detail each of these steps.

For each image a homography is computed that is later used for warping. The homography is a mathematical mapping from physical ground plane (floor) coordinates (x,y) to pixel coordinates (u,v) in the image. To compute the homography for each image, there must be at least four (u,v) points in the image for which the corresponding absolute (x,y) coordinates on the ground plane are known. One way to get these known (x,y) points is to measure certain visible floor points in the room, like the corners of a rug, with a tape measure. Another method, as discussed previously, is to lay down calibration targets at known (x,y) locations on the floor.

As discussed above, an index number may be associated with each prescribed point or calibration target, and the system and method according to the present invention uses a previously generated data file that gives the (x,y) location of each target based on its index number. To determine the correspondence between the (x,y) locations in the room and their associated positions in each image, the user selects the calibration target centers in the image with a mouse or other input device and enters the corresponding index number for each. The point thus selected is taken to be the (u,v) image location of the target in pixels. This process of building up the data file could also be performed automatically, for example, by using character recognition. This is especially feasible if the index number and (x,y) locations of each target are indicated on each image. The program thus builds an array of corresponding (u,v) and (x,y) points for each image. When the user has entered four corresponding (u,v) and (x,y) points for a particular image, the homography can be calculated directly. If the user has entered more than four corresponding points, a least squares approach can be employed to compute a potentially more accurate homography. It is noted that once the homography has been generated, this data can be used without repeating the calibration process unless the camera used to generate the image employed to compute the homography is moved.

Given a (x,y) point on the floor or ground plane, the homography, H, gives the corresponding (u,v) pixel coordinates in an image. The homography is used to make an image of the ground plane from the camera image. The ground plane image starts with a 2-D array of ground plane points. This array of points extends from $x_{min}$ to $x_{max}$ in the x direction and from $y_{min}$ to $y_{max}$ in the y direction. The points are separated by $\Delta x$ and $\Delta y$ in the x and y directions, respectively.

A ground plane image is made by taking each (x,y) point in the ground plane array, computing the corresponding (u,v) pixel location in the image (with rounding to get integer pixel coordinates), and placing that pixel (pixel color intensity) in that cell of the ground plane array. It is preferable to make each cell of the grid of the ground plane a size that corresponds to the area depicted in each pixel of the image of the room under consideration, to ensure a good resolution for accurate modeling. If the computed (u,v) falls outside the bounds of the image, then the pixel value of that cell is made black. The points $(x_{min}, y_{max})$ and $(x_{max}, y_{max})$ are selected to cover the region of the room being modeled, and $(\Delta x, \Delta y)$ is selected such that ground plane images of about 500×500 pixels are achieved. To make the scale isotropic, $\Delta x = \Delta y$ is typically selected.

A ground plane image is generated for each camera image using the above-generated array. These ground plane images are then imported one by one into a drawing program such as MICROSOFT VISIO®. The ground plane images all have the same scale because they are preferably all based on the same $(\Delta x, \Delta y)$. The coordinate axes of the ground plane image may be drawn in the images to make the images easier to superimpose when importing the images into the drawing program.

The drawing program is then used to make the room model. Using a couch as an example, to begin with a scale model of the couch is made in the drawing program. The same scale is used as was for the ground plane images. The model's dimensions can come from manually measuring the actual couch in the room or by inferring the dimensions from the ground plane image. The couch model drawing is dragged into the appropriate location on top of the ground plane image. While the ground plane image of the couch is unrealistically distorted because it extends above the ground plane, the bottom of the couch where it rests on the floor is accurately represented in the image. If the model of the couch is lined up with the points where the real couch touches the floor, the drawing will be accurately placed in the room. The user may then continue dragging in other pieces of furniture, walls, and doors. The user repeats the dragging and placing process for each warped image, overlapping them so their x and y axes correspond. If the current image shows an object that was already placed based on one of the previous images, that object can be ignored in the current image. After the user has dragged in all the drawings, he or she deletes the images and is left with the floor plan. The user may also embellish the drawing with other elements to make a model of the room.

DESCRIPTION OF THE DRAWINGS

The specific features, aspects, and advantages of the present invention will become better understood with regard to the following description, appended claims and accompanying drawings where:

DETAILED DESCRIPTION OF THE PREFERRED EMBODIMENTS

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Exemplary Operating Environment

Figure 1:
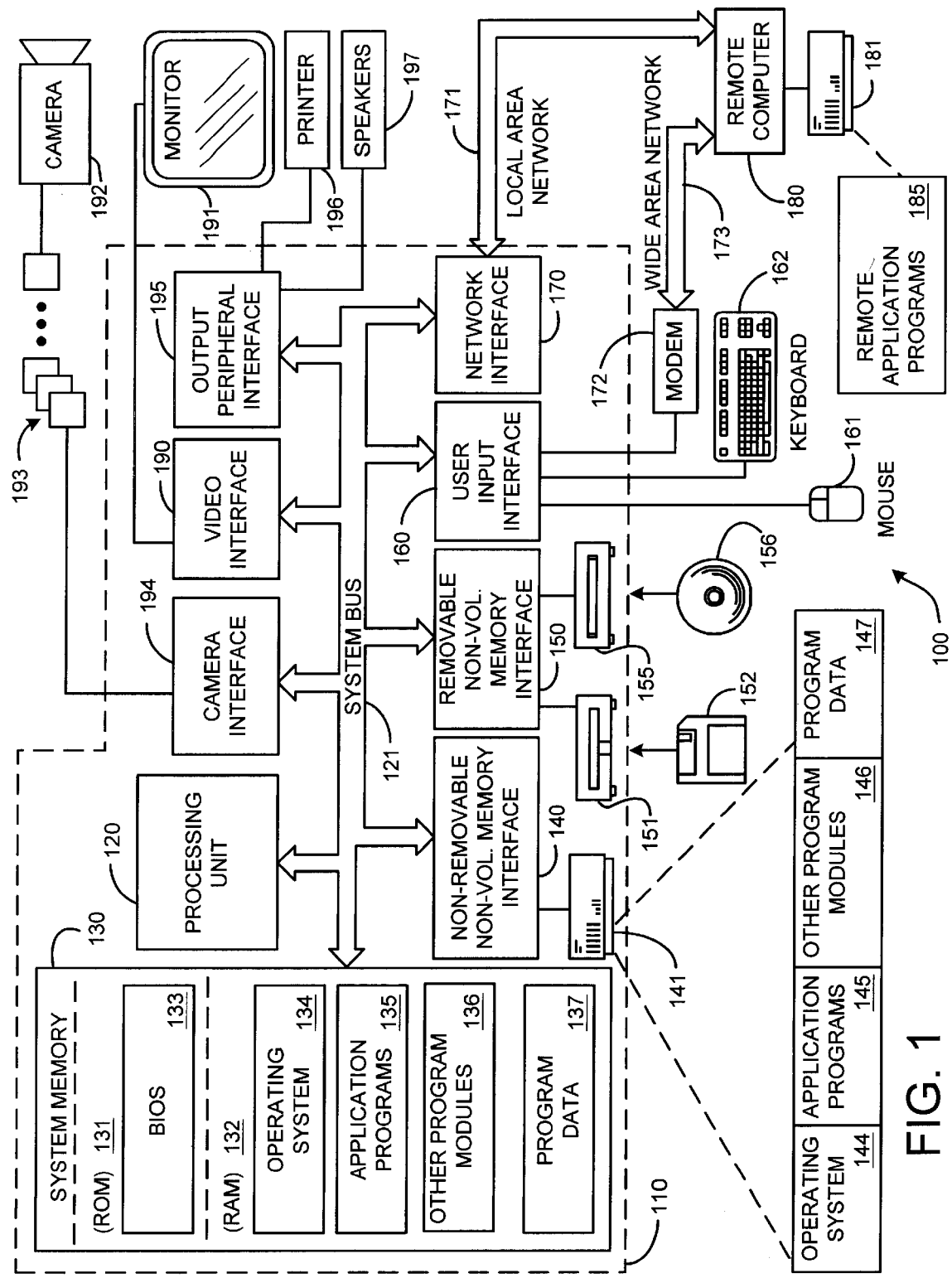
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 10 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134 application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

System Overview

Based on images of a room, the system and method according to the present invention lets a user interactively build a geometrically accurate floor model of a room and place pictorial representations of items in the room without having to measure the various items in the room or the exact measurements of the room first.

Figure 2:
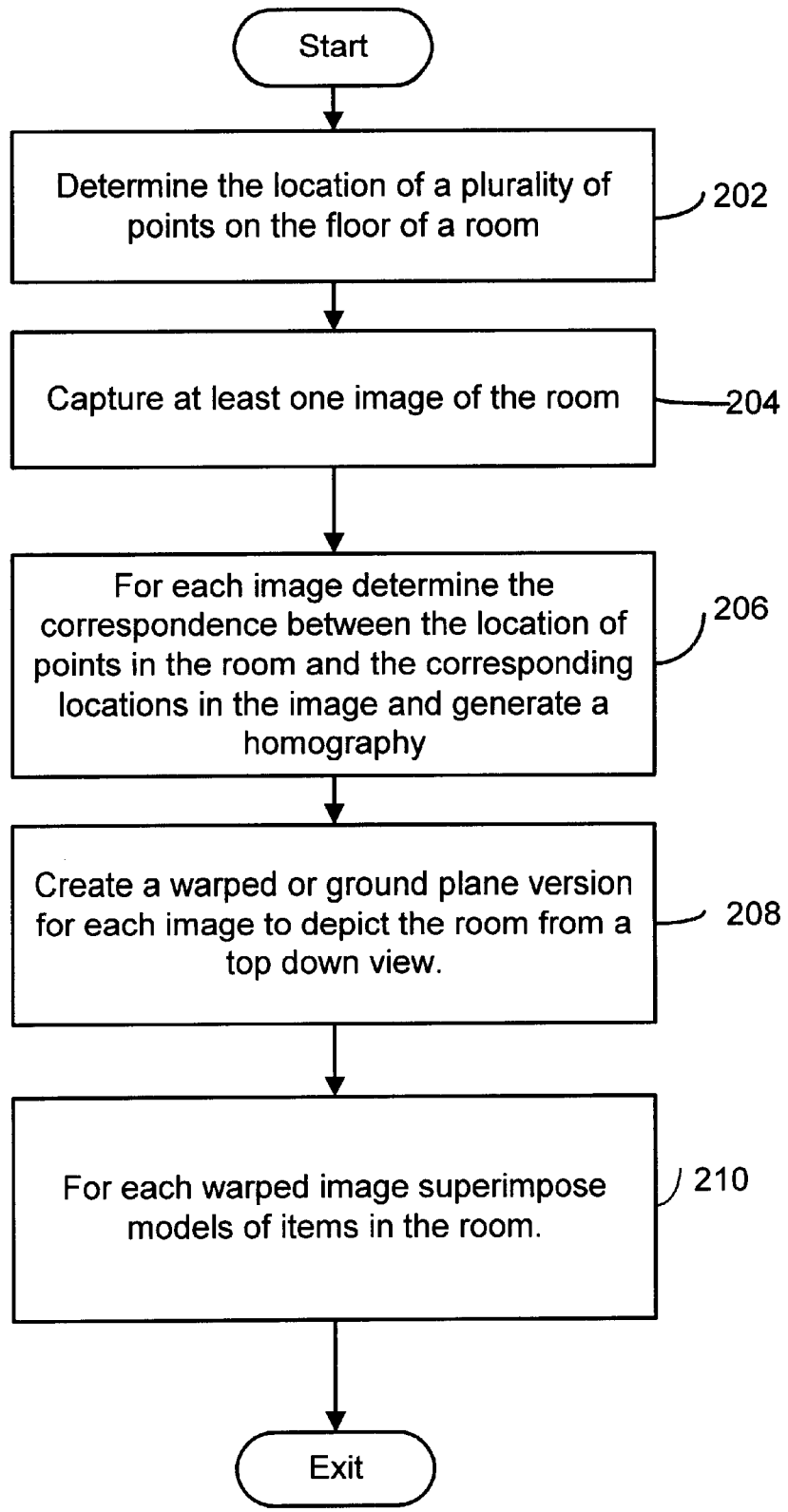
FIG. 2 is a general flow diagram of the system and method according to the present invention.

As shown in FIG. 2, the system and method according to the present invention generally begins with the determination of the location of a number of points on the floor of the room to be modeled (process action 202). Next, one or more images of the room are captured (process action 204). It is necessary to have at least one view of everything the user desires to have modeled in the floor plan. Thus, for example, if it is desired to create a floor plan of an L-shaped room, at least two images of the room must be captured, each depicting one leg of the L-shaped room. There may be some overlap in the images, however, more than one view of each item is not needed. The correspondence between the locations of points in the room and the equivalent location of these points in each image is then determined (process action 206). To determine this correspondence, the floor of the room to be modeled may be marked with "calibration markers" placed at known (x,y) locations on the floor. The user then selects the calibration markers with an input device such as a mouse by "clicking" on them in a displayed image of the room (or part thereof) to establish a correspondence between their absolute (x,y) coordinates on the floor and their image coordinates in each view. These correspondences are used to compute a "homography" for each image. The homography is in turn used to compute a warped version of each image, as shown in process action 208, showing what the room would look like if viewed from above. These warped or ground plane images are each rendered with respect to the same origin. As shown in process action 210, with the images warped to a common viewpoint and scale, they can be used as guides in a conventional drawing program to superimpose models of items in the room onto the warped images. To accomplish this task, the user drags pictures of furniture, walls, and other objects in the room on top of the warped images. The images are then deleted, leaving behind the room's objects in their correct locations.

A more detailed description of the various aspects of this system and method follows.

Computing the Homography

Figure 3:
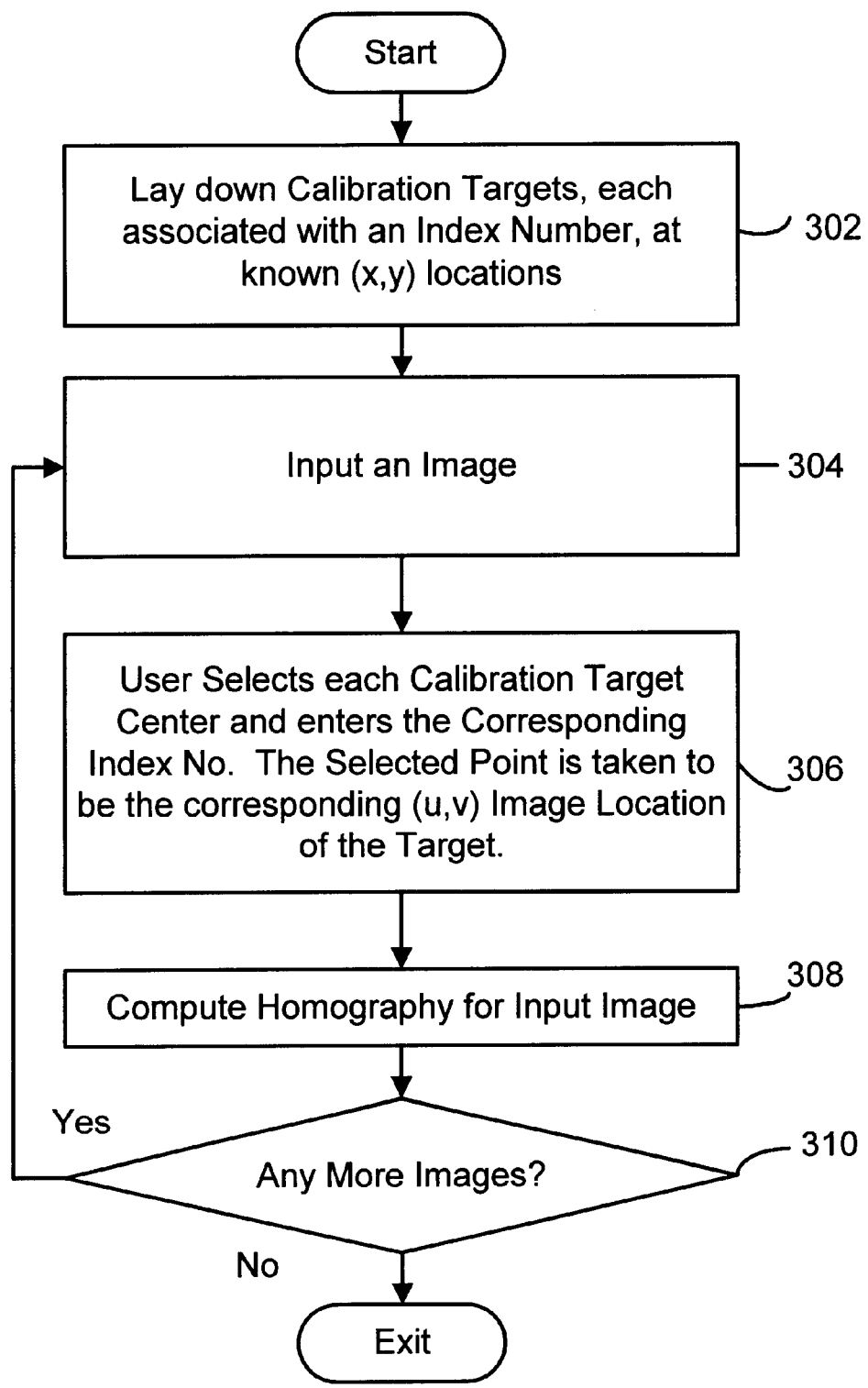
FIG. 3 is a flow diagram showing the computation of a homography for each input image used in the room modeling process.
Figure 4A:
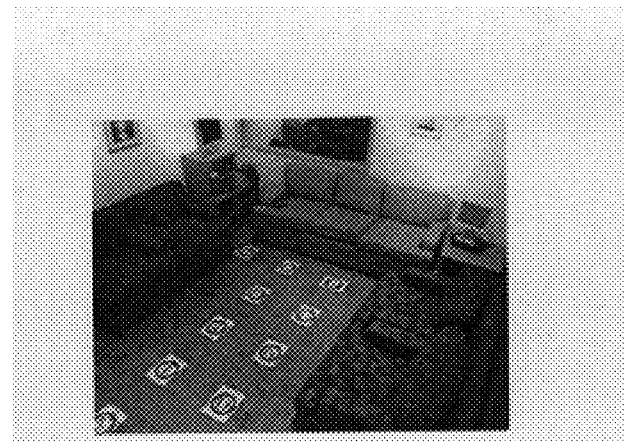
FIGS. 4A through 4C depict images used to model part of the room; calibration markers are depicted on the floor.
Figure 4B:
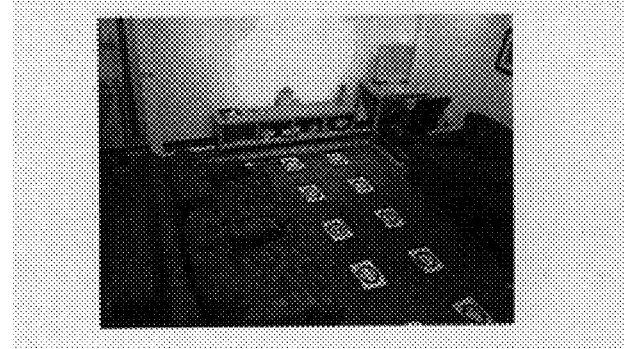
Figure 4C:
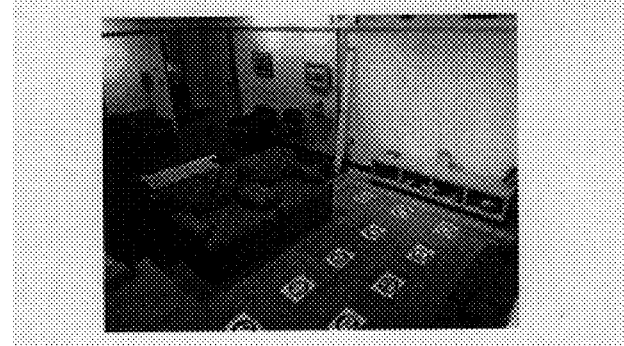

For each image used to create the room model, a homography (H), is computed that is later used for warping. This homography is a mathematical mapping from physical ground plane (floor) coordinates (x,y) to pixel coordinates (u,v) in the image. To compute the homography, there must be at least four (u,v) points in the image for which the corresponding absolute (x,y) coordinates on the ground plane are known. One method of obtaining these known (x,y) points, as shown in FIG. 3 process action 302, and depicted in FIGS. 4A through 4C, is to lay down calibration targets at known (x,y) locations in the room as was done in a prototype version of the system and method according to the present invention. These calibration markers should be spread out as much as possible in the room. It is critical that each of the markers are on the floor (ground plane). Additionally, there should be at least four calibration points in each view. The preferred range of the number of calibration points is between four and 20, depending on the size of the room.

An index number is associated with each calibration target, and a data file is generated that gives the (x,y) location of each target based on its index number. As shown in process actions 304 and 306, to determine the correspondence between the (x,y) locations in the room and their associated (u,v) positions in a given image, the user "clicks on" (uses an input device to select) the calibration target centers in the image and enters the corresponding index number for each. The clicked point is taken to be the (u,v) image location of the target. This process of building up the data file can also be performed automatically, for example, by using character recognition to read the index numbers off of an image that displays them and correlates this data to a previously-entered calibration target. Alternately, the (x,y) location of each target could be displayed along with the index number on the target itself and could be read in the data file using a character recognition technique. The present system and method thus builds an array of corresponding (u,v) and (x,y) points. When the four such corresponding (u,v) and (x,y) points have been entered for a particular image then the associated homography, can be calculated (process action 308). Specifically, $$\begin{bmatrix} u' \\ v' \\ w' \end{bmatrix} = H \begin{bmatrix} x \\ y \\ 1 \end{bmatrix}$$

where $$H = \begin{bmatrix} h_{11} & h_{12} & h_{13} \\ h_{21} & h_{22} & h_{23} \\ h_{31} & h_{32} & h_{33} \end{bmatrix}$$

and $$u=u'/w'$$

$$v=v'/w'$$

However, if the user enters more than four corresponding points, a common least squares approach can be employed to compute a potentially more accurate homography. Finally, as shown in process action 310, the process of actions 304 through 308 is repeated for each image that is used in the modeling process.

Another way to obtain the known (x,y) points is to measure the location of certain visible floor points in the room, like the corners of a rug, instead of using calibration markers. If pre-measured points are used instead of calibration markers, the above procedure would be generally the same, however, index numbers would be assigned to each measured (x,y) point and the user would enter these (x,y) points along with the index number to create the aforementioned data file. The user would then "click on" the visible floor points and the process would proceed on as with the calibration target embodiment.

It is noted that the homography computed using an image from a particular camera can be used to map the coordinates of the pixels of an image captured by the camera to a ground plane image (i.e., warping), unless the camera used to generate the images used to compute the homography is moved. If the camera is moved, the calibration process must be replaced and a new homography computed.

Generating a Ground Plane Image

Figure 5A:
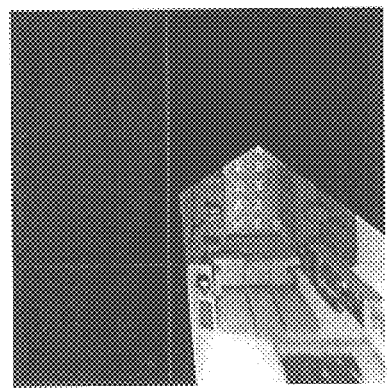
FIGS. 5A through 5C depict the images shown in FIGS. 4A through 4C, all with the same scale of pixels per centimeter, warped to make a top down view.
Figure 5B:
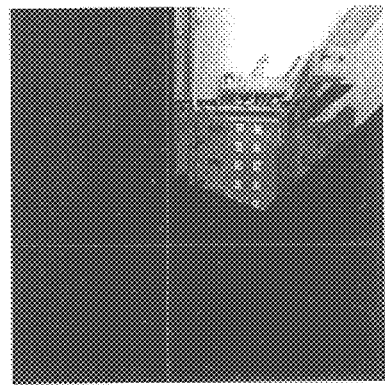
Figure 5C:
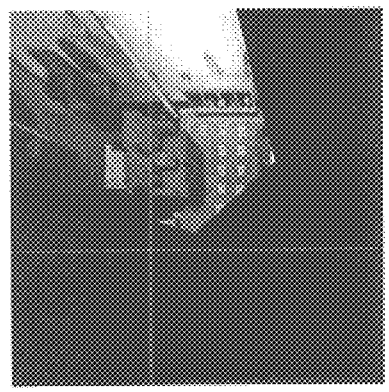

Once a homography is computed for a particular camera location, it is used to produce a ground plane image, based on the image captured by the camera associated with the homography. This image can be the same image used to compute the homography or a subsequently captured image (as long as the camera has not been moved). For example, as shown in FIGS. 5A through 5C, the images of a room are warped to make a top down view with the same origin and the same scale (pixels per centimeter). Specifically, the ground plane image is generated by establishing a 2-D array of ground plane points. This array of points extends from $x_{min}$ to $x_{max}$ in the x direction and from $y_{min}$ to $y_{max}$ in the y direction. The points are separated by $\Delta x$ and $\Delta y$ in the x and y directions, respectively. Thus, an array of ground plane points as shown in Table 1 is produced:

TABLE 1

| $(x_{min}, y_{min})$ | $(x_{min} + \Delta x, y_{min})$ | ... | $(x_{max} - \Delta x, y_{min})$ | $(x_{max}, y_{min})$ |
|---|---|---|---|---|
| $(x_{min}, y_{min} + \Delta y)$ | $(x_{min} + \Delta x, y_{min} + \Delta y)$ | ... | $(x_{max} - \Delta x, y_{min} + \Delta y)$ | $(x_{max}, y_{min} + \Delta y)$ |
| . | . | . | . | . |
| . | . | . | . | . |
| . | . | . | . | . |
| $(x_{min}, y_{max} - \Delta y)$ | $(x_{min} + \Delta x, y_{max} - \Delta y)$ | ... | $(x_{max} - \Delta x, y_{max} - \Delta y)$ | $(x_{max}, y_{max} - \Delta y)$ |
| $(x_{min}, y_{max})$ | $(x_{min} + \Delta x, y_{max})$ | ... | $(x_{max} - \Delta x, y_{max})$ | $(x_{max}, y_{max})$ |

Figure 6:
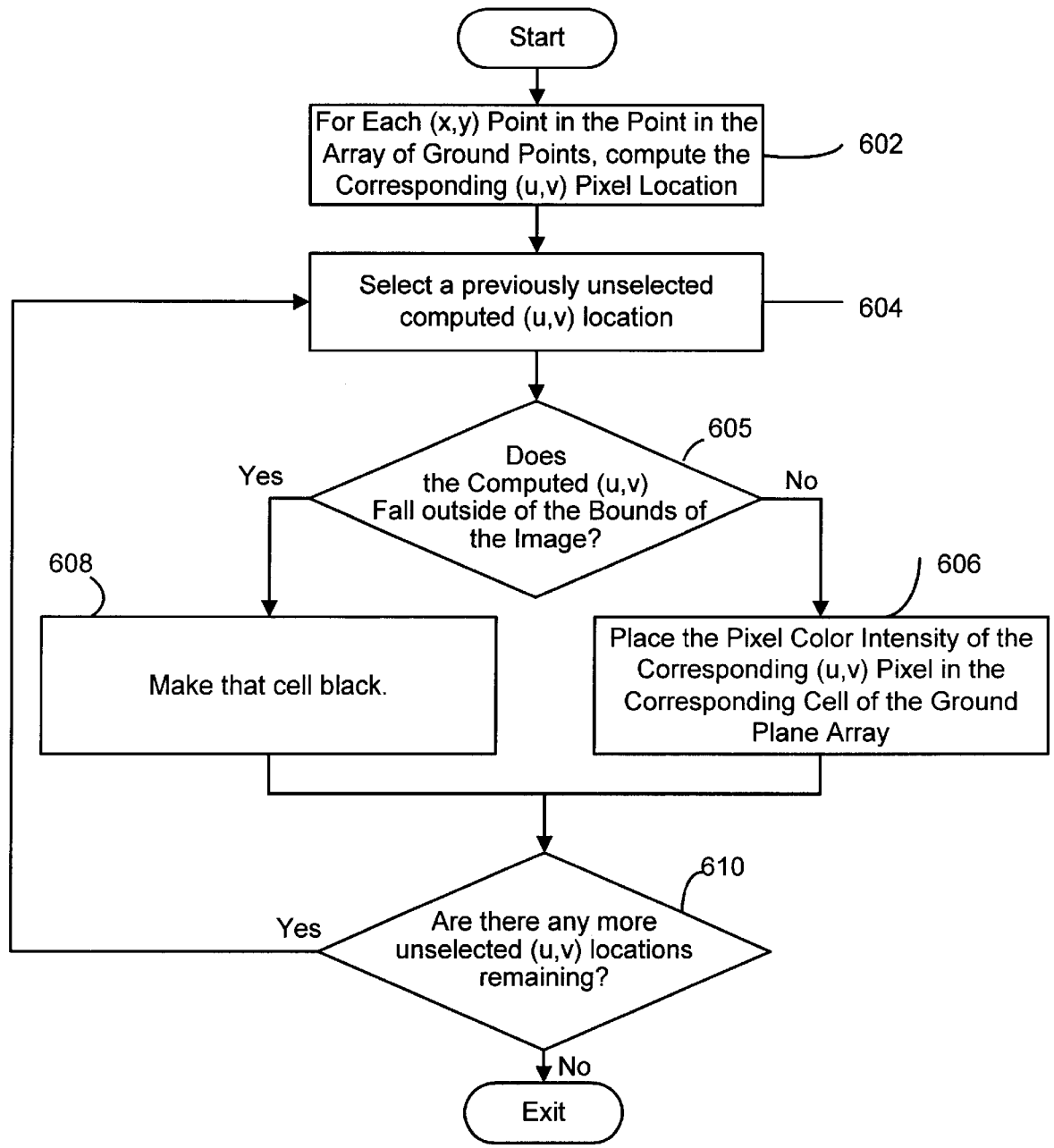
FIG. 6 depicts a flow diagram depicting the process which is used to warp the images.

As outlined in FIG. 6, a ground plane image is made by taking each (x,y) point in the ground plane array, computing the corresponding (u,v) pixel location in the image (with rounding to get integer pixel coordinates) (process actions 602, 604), and placing that pixel value (e.g., pixel color intensity) in that cell of the ground plane array (process actions 605 and 606) if the computed (u,v) point does not fall outside the bounds of the image. It is preferable to make each cell of the grid of the ground plane a size that corresponds to the area depicted in each pixel of the image of the room under consideration, to ensure a good resolution for accurate modeling. Typically, this is achieved when the cells on the ground plane are sized between one and ten centimeters. If it is determined that the computed point (u,v) falls outside the bounds of the image (process action 605), the pixel value of that cell is made zero (e.g., black if pixel intensity is used) (process action 608). Specifically, this is accomplished by checking the computed (u,v,) against the boundary values of the rectangular image, $u_{min}$, $u_{max}$, $v_{min}$, and $v_{max}$. The computed (u,v,) is outside the image and is turned black if $u<u_{min}$ or $u>u_{max}$ or $v<v_{min}$ or $v>v_{max}$. The points $(x_{min}, y_{min})$ and $(x_{max}, y_{max})$ are selected to cover the region of the room being modeled as depicted in the image under consideration, and $(\Delta x, \Delta y)$ is preferably selected such that ground plane images of about 500×500 pixels are created. To make the scale isotropic, $\Delta x = \Delta y$ is preferably selected.

A ground plane image is then generated from each camera image using the generated array. This is repeated for each of the images being used to model the room. The ground plane images will all have the same scale because they are preferably all based on the same $(\Delta x, \Delta y)$. It is noted that the homography cannot correctly map points that are not on the ground plane, so anything that extends up above (or down below) the floor is warped out of proportion as is evident in FIGS. 5A–5C. This is satisfactory for modeling, however, as the next part of the process only uses points on the ground plane.

Interactively Modeling the Floor Plan

Figure 7:
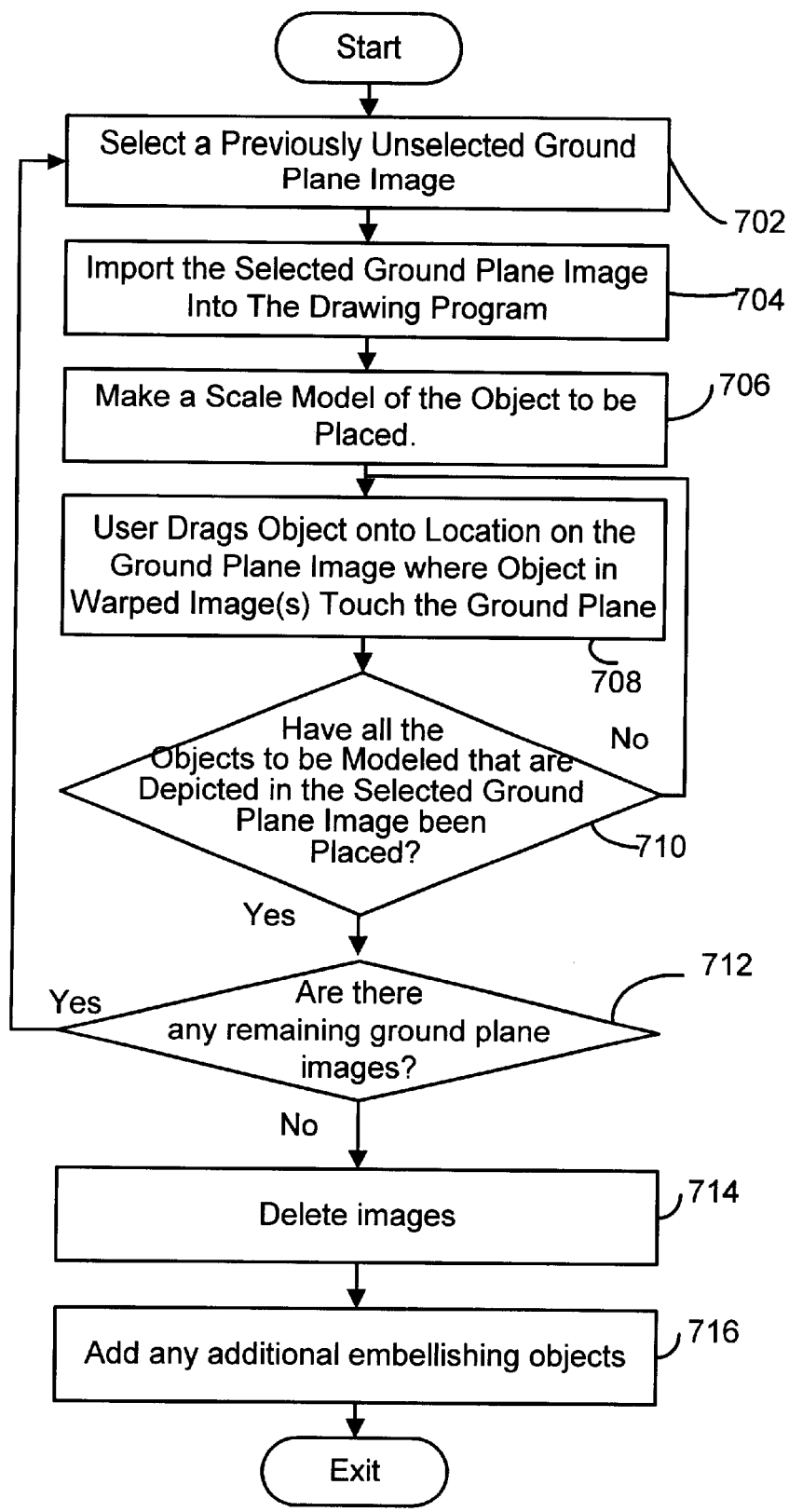
FIG. 7 depicts a flow diagram depicting the process which is used to drag pictures of the room's contents into the correct locations on top of the ground plane image.
Figure 8:
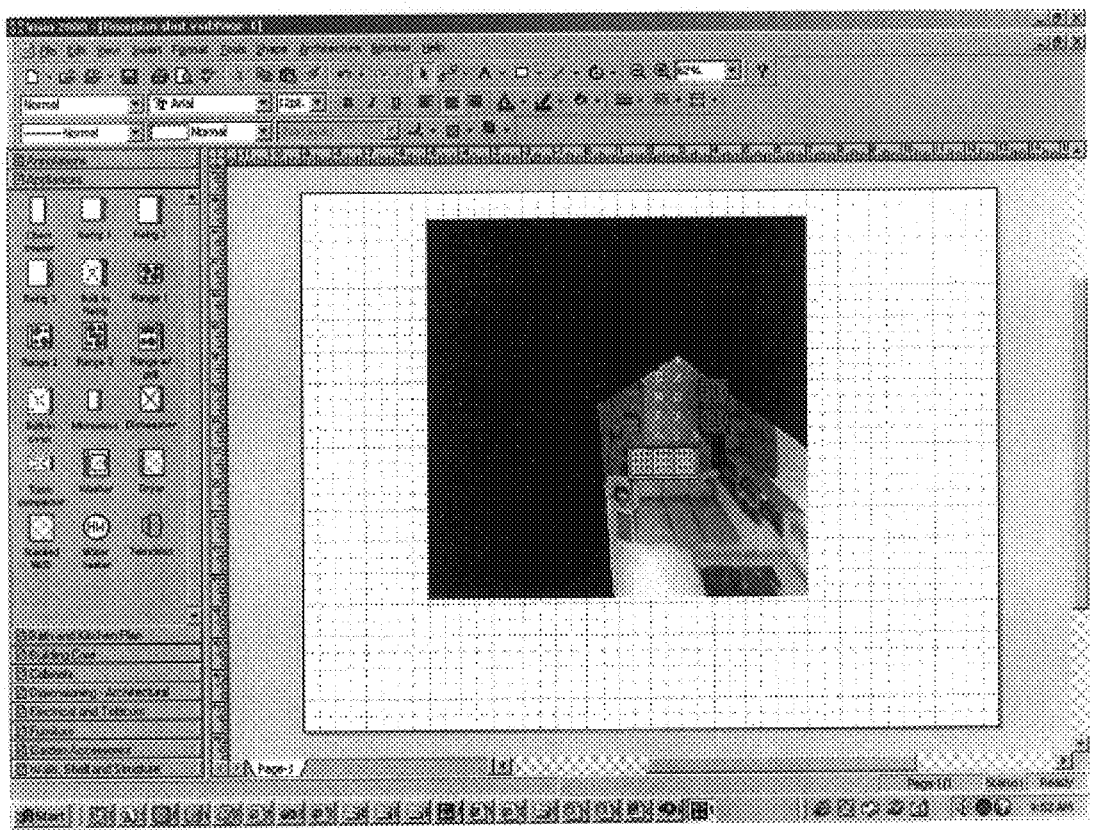
FIG. 8 depicts the screen of a drawing program used to model the room's layout.
Figure 9:
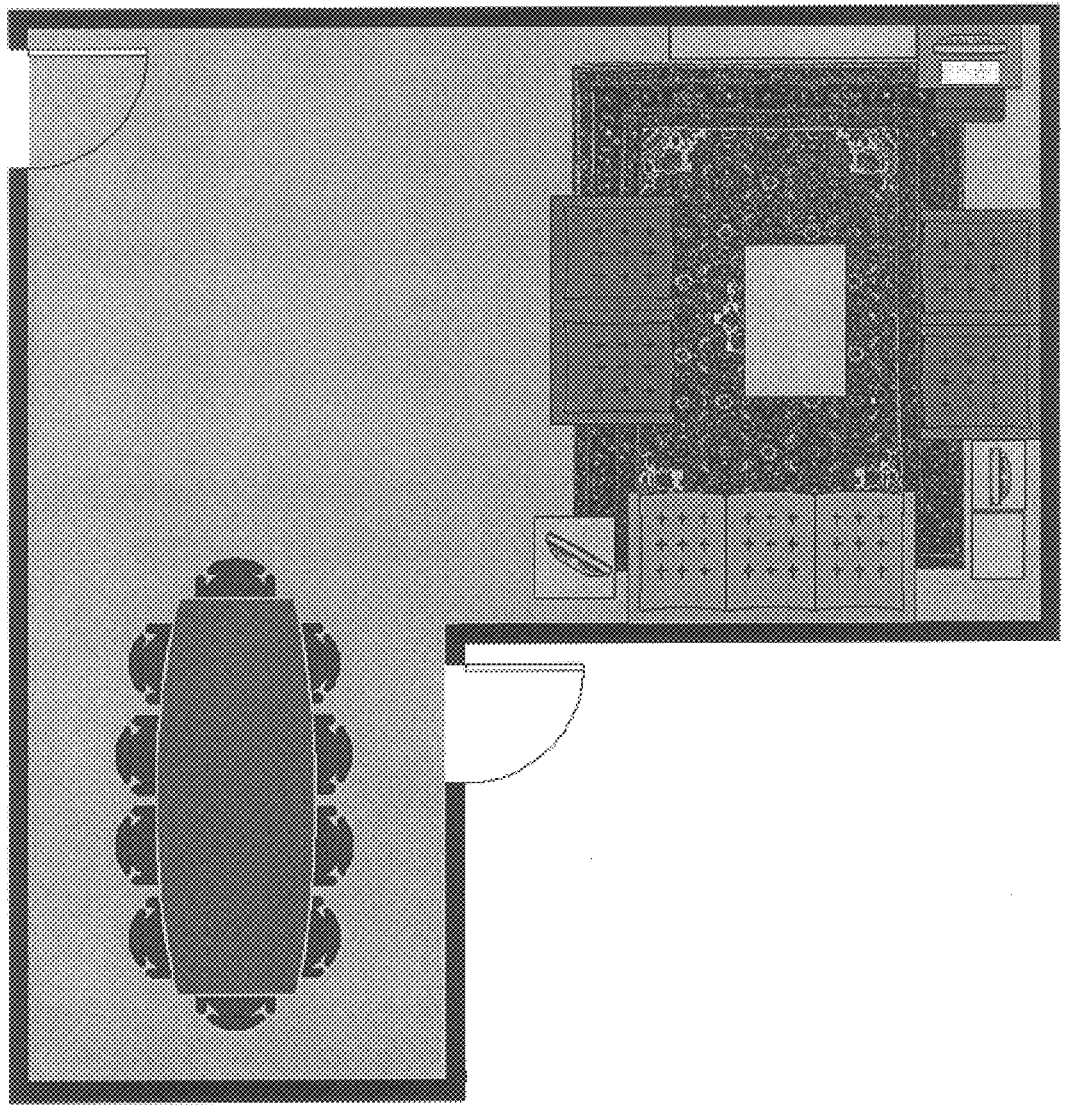
FIG. 9 shows a completed model of a room interactively made using the system and process according to the present invention.

The ground plane image or images, as the case may be, are used to create a floor plan of the room. Referring to FIG. 7, this is accomplished by first selecting one of the ground plane images (process action 702) and importing it to a drawing program (process action 704) such as MICROSOFT VISIO®. The imported ground plane image would appear as shown in FIG. 8. Referring again to FIG. 7, a scale model of an object to be modeled, such as a couch, is made or selected from existing icons in the drawing program (process action 706). The same scale is used as was for the ground plane images. The model's dimensions can come from manually measuring the actual couch in the room or by inferring the dimensions from the ground plane image. As indicated by in process action 708, the couch model drawing is dragged and placed at the appropriate location on top of the ground plane image. While the ground plane image of the couch is unrealistically distorted because it extends above the ground plane, the bottom of the couch where it rests on the floor is accurately represented in the image. If the model of the couch is lined up with the points where the real couch touches the floor, the drawing will be accurately placed in the room. The user continues dragging in other pieces of furniture, walls, doors, etc. into the displayed ground plane image until all the desired objects in the image have been included, as indicated by process action 710. Once all the objects it is desired to model have been placed in the selected ground plane image, it is determined if there are any remaining ground plane images to process (process action 712). If so, the user repeats the dragging and placing process for each remaining ground plane image, overlapping them so their x and y axes correspond. In areas of overlap between images, the user can ignore previously placed objects and just place drawings of objects not yet modeled. As indicated by process action 714, after the user has processed all the ground plane images, he or she deletes the images and is left with the floor plan as shown in FIG. 9. The user may also embellish the drawing with other elements to make a model of the room, as desired (process action 716).

While the invention has been described in detail by specific reference to preferred embodiments thereof, it is understood that variations and modifications thereof may be made without departing from the true spirit and scope of the invention. For example, the system and method described above is not limited to use with just room models. Models of other items such as aircraft, watercraft, rooftops, cities, circuit boards, parks, land areas, and anything with a dominant plane could also be made.

Wherefore, having thus described the present invention, what is claimed is:

1. A computer-implemented process for generating a geometric model of a space, comprising using a computer to perform the process actions of:
    ascertaining the coordinates of a plurality of points on a ground plane of the space;
    capturing at least one image of the space;
    for each image, determining the correspondence between the ground plane coordinates of the space and the corresponding locations in said image;
    creating a warped version for each image to depict the space from a top down view; and
    superimposing models of items in said space at locations on the ground plane where actual items are depicted in each warped image as touching the ground plane.

2. The process of claim 1, wherein the action of ascertaining the coordinates of said ground plane points comprises the process actions of:
    placing calibration targets at known locations on the ground plane of the space;
    associating each calibration target with an index number; and
    entering the known ground plane location and index number associated with each calibration target into a data file.

3. The process of claim 2, wherein the process action of placing calibration targets on the ground plane comprises an action of placing enough targets on the ground plane such that at least four targets are depicted in each image of the space.

4. The process of claim 3, wherein between four and approximately ten calibration targets are placed so as to appear in each image of the scene.

5. The process of claim 2, wherein the process action of placing calibration on the ground plane comprises the action of dispersing the calibration targets as widely as possible given their numbers.

6. The process of claim 2, wherein the process action of entering the known ground plane location and index number associated with each calibration target comprises an action of a user entering the known ground plane location and index number associated with each calibration target into said data file.

7. The process of claim 2, wherein the process action of entering the ground plane location and index number associated with each calibration target comprises the actions of:
   marking each calibration target with the known ground plane location and index number associated with that target in a manner readable by a conventional character recognition program; and
   using said conventional character recognition program to read the location and index number from each calibration target from each image of the space.

8. The process of claim 1, wherein the action of ascertaining the coordinates of said ground plane points comprises the actions of:
   identifying the location of each of a set of points associated with prescribed ground plane features that appear in the at least one image of the space;
   associating an index number with each point of the set of points; and
   entering the identified location and index number associated with each of the set of points.

9. The process of claim 8, wherein the process action of identifying the location of each of the set of points comprises the action of identifying the location of at least four points in each image of the space.

10. The process of claim 9, wherein the location between four and approximately ten points are identified in each image of the space.

11. The process of claim 8, wherein the process action of identifying the location of each of the set of points comprises the action of identifying the location of points that are as widely dispersed as possible given their number.

12. The process of claim 8, wherein the process action of entering the known ground plane location and index number associated with each point comprises an action of a user entering the known ground plane location and index number associated with each point into a data file.

13. The process of claim 2 wherein the process action of determining the correspondence between the coordinates in the space and the corresponding locations in said image comprises:
   for each captured image
      displaying the image on a computer monitor screen of the computer;
      having a user select a point corresponding to the center of at least four calibration targets depicted in the image;
      having the user enter the index number associated with each selected point; and
      computing a homography which is capable of mapping points on the ground plane of the space to pixel locations in the image from the selected points and the known location of these points on the ground plane as identified by the index number entered for that point.

14. The process of claim 13, wherein the process action of having the user select points corresponding to at least four calibration target centers comprises an action of having the user select more than four points, and wherein the process action of computing the homography comprises an action of using a least squares approach to compute the homography.

15. The process of claim 1, wherein the process action of creating a warped version of each image to depict the space from a top down view comprises, for each image, the process actions of:
   creating an array of cells each cell of which represents a pixel of ground plane image of the space defined by a particular (x,y) position separated by a prescribed $\Delta x$ and $\Delta y$;
   computing the location in the image corresponding to the (x,y) position associated with each of the cells of the array using the previously determined correspondence;
   identifying the pixel of the image that most closely corresponds to each computed location;
   assigning the pixel value associated with each identified pixel to the cell of the array corresponding to the (x,y) position used to identify the pixel; and
   generating a ground plane image of the portion of the space depicted in the image using the assigned pixel values.

16. The process of claim 15 further comprising the process actions of:
   determining whether each computed image location falls outside the bounds of the image; and
   whenever the computed image location falls outside the bounds of the image, setting the pixel value of the cell of the array associated with the computed image location to zero.

17. The process of claim 16, wherein said pixel value is the color intensity of the image pixel under consideration.

18. The process of claim 15 wherein the $\Delta x$ and $\Delta y$ of each cell in the array corresponds to the size of one pixel in the captured image.

19. The process of claim 15, wherein $\Delta x$ and $\Delta y$ are the same length.

20. The process of claim 1 wherein the process action of superimposing models comprises, for each warped image, the actions of:
   displaying the warped image to a user on a computer monitor screen;
   obtaining a 2-D drawing of each object that is to be modeled in the warped image as it would appear in a top-down view;
   placing the drawing of each object onto a location on the warped image where the object touches the ground plane in the image.

21. The process of claim 20, further comprising the process action of deleting the warped images leaving just the placing drawings which represent a floor plan of the space.

22. The process of claim 21, further comprising the process action of adding any embellishing objects not in the original captured image to the floor plan.

23. The process of claim 20 wherein the action of superimposing models is performed after importing the warped images into a drawing program.

24. The process of claim 20 wherein the same scale is used for the drawing model of said object as was used for the warped image.

25. A system for interactively creating a model of a space, the system comprising:
- at least one camera positioned so as to have a view of the space to be modeled;
- a general purpose computing device; and
- a computer program comprising program modules executable by the computing device, wherein the computing device is directed by the program modules of the computer program to,
  - determine the locations of a plurality of points in a ground plane of the space;
  - input at least one image of the space from the at least one camera;
  - for each image,
    - compute a mapping between the locations of the plurality of points in the space and the corresponding points in the image;
    - create a top down view from the image correctly depicting the locations where objects in the space touch the ground plane of the space using the image and the mapping;
    - import the top down view into a drawing program; and
    - place models of objects in the space onto the top down view in the drawing program.

26. The system of claim 25, wherein the entire space it is desired to model cannot be imaged using just one camera, and wherein a sufficient number of cameras are used such that every part of the space is desired to model can be imaged using one of the cameras.

27. The system of claim 26, wherein each camera is used to capture an image of the space, and wherein the program module for inputting at least one image of the space comprises a sub-module for inputting an image from each camera.

28. A computer-readable medium having computer-executable instructions for generating a geometric model of a space using a camera, said computer-executable instructions comprising:
- ascertaining the coordinates of a number of points on a ground plane of the space;
- capturing at least one image of the space;
- for each image, determining the relationship between the ground plane coordinates of the space and the corresponding locations in said image;
- creating a warped version for each image to depict the space from a top down view; and
- superimposing models of items in said space at locations on the ground plane where actual items are depicted in each warped image as touching the ground plane.

* * * * *